Patented Jan. 14, 1947

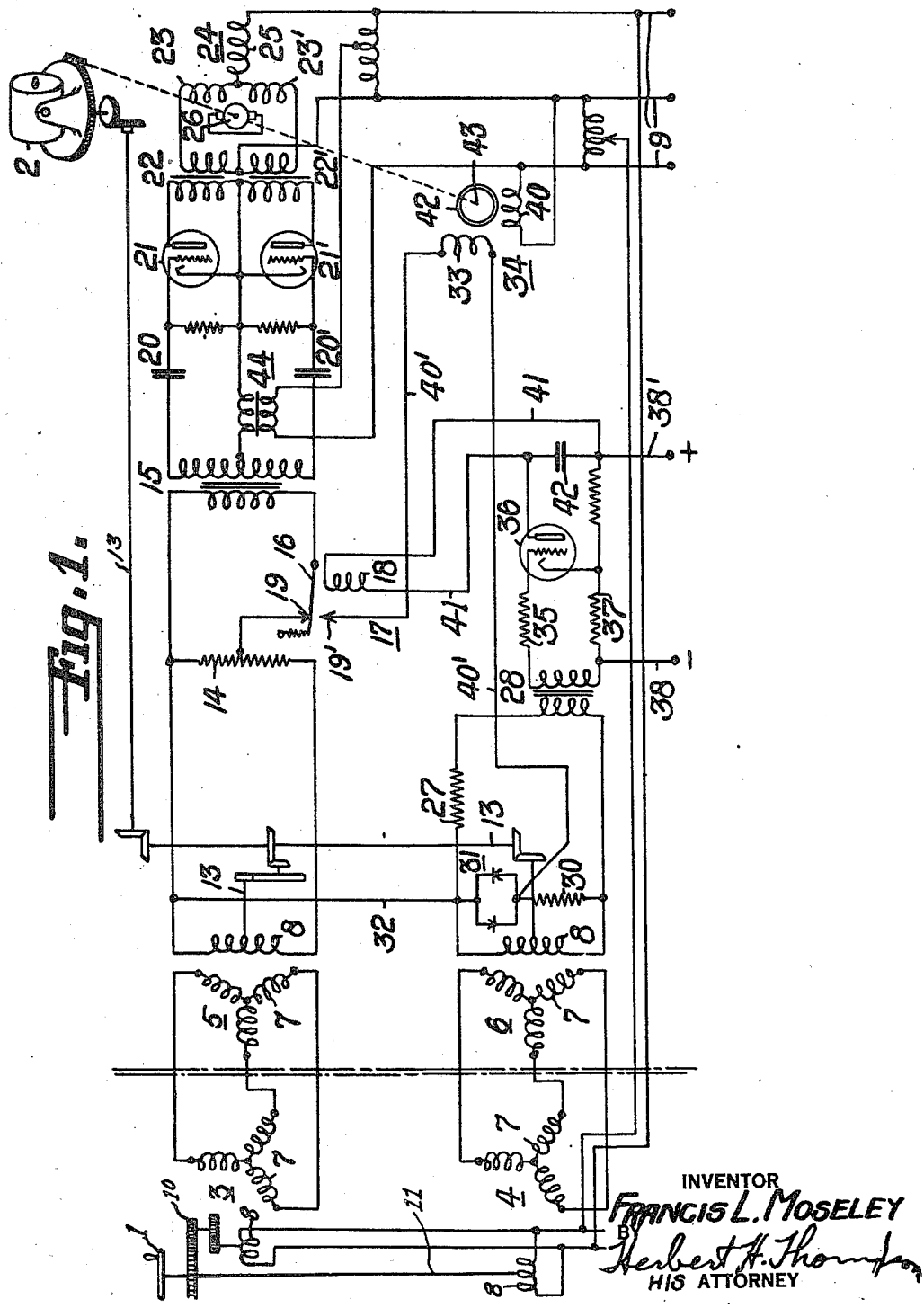

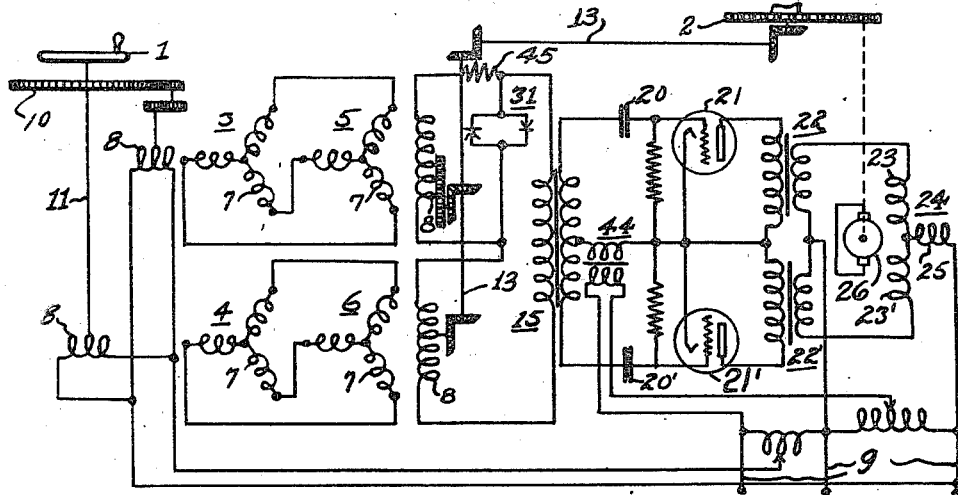
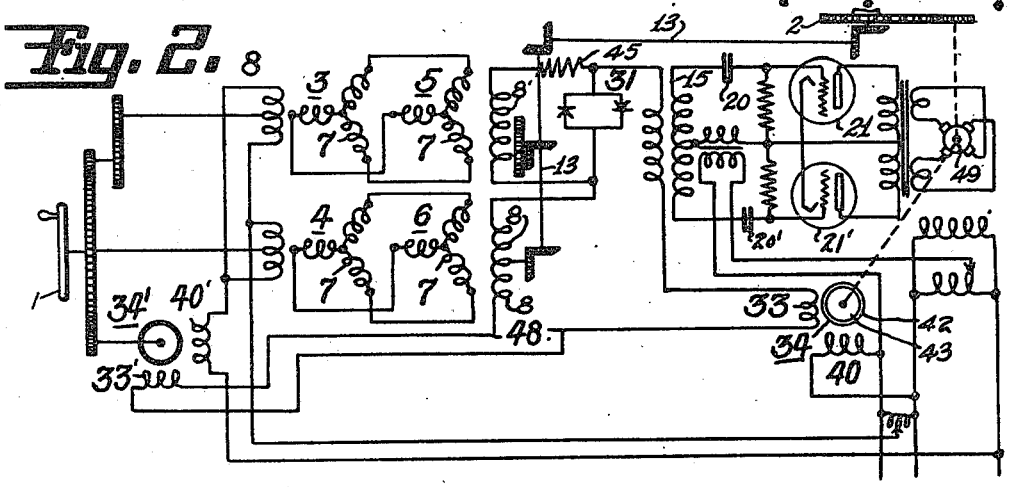
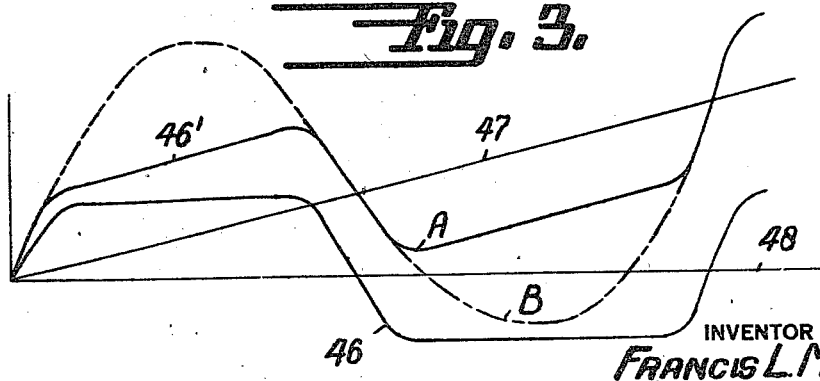

2,414,384

UNITED STATES PATENT OFFICE 2,414,384

ELECTRIC MOTOR POSITION CONTROL SYSTEM

Francis L. Moseley, Pelham, N. Y., assignor to Sperry Gyroscope Company, Inc., Brooklyn, N. Y., a corporation of New York Application September 24, 1935, Serial No. 41,851

45 Claims. (Cl. 172—239)

1

This invention relates, generally, to electrical control systems, and the invention has reference, more particularly, to a novel electrical position control system wherein a controlling object is arranged to operate through suitable electrically operable means to cause a controlled object to move in substantial synchronism with the controlling object, said electrically operable means employing a pair of signal voltage transmitters operating in different speed ratios, i. e., a fine or high speed transmitter and a coarse or low speed transmitter.

To obtain great accuracy of reproduction by the controlled object of motion of the controlling object, i. e., substantial synchronism of the objects, it is necessary to employ a fine or high speed signal voltage transmitter and connected receiver arrangement. This high speed arrangement may operate in a ratio, for example, of 36:1. However, when using this arrangement alone and without the aid of a coarse or low speed arrangement, it will be apparent that should the controlling and controlled objects get out of synchronism by an amount greater than the range of control of the high speed arrangement, the objects will permanently remain out of step. Thus, when using the above 36:1 ratio, the relative displacement of the objects cannot exceed 5° in order for the fine arrangement to retain proper control, since it will be noted that 5° of relative movement of the objects is equivalent to 180° of movement of the fine transmitter. Inasmuch as the objects may get out of step any amount from 0° to 180° in either direction due, for example, to the turning of the controlling object, such as a handwheel or telescope, when the system is not in operation, it is necessary to employ a suitable low speed arrangement for operation in conjunction with the high speed arrangement.

The principal object of the present invention is to provide a novel position control system employing high and low speed transmitter and receiver arrangements, which system is so constructed and arranged that, in the event of the occurrence of a relative displacement of the controlling and controlled objects of such magnitude as to be without the range of control of the high speed arrangement, then the low speed arrangement acting either singly or, if desired, in conjunction with the high speed arrangement, will serve to move the controlled object toward a position of synchronism with the controlling object at any desired suitable speed, such speed either being held constant or variable, depending upon the requirements of any particular installation.

Another object of the present invention lies in the provision of a novel position control system of the above character wherein voltage limiting means is employed for definitely limiting the signal potential supplied from either the high or low speed transmitters, as desired, thereby obtaining a more satisfactory operation and preventing excessive speed of the controlled object as well as overrunning or hunting thereof about the point of correspondence, the use of said voltage limiting means also enabling the addition of the signal potentials of the high and low speed transmitters for use in controlling the operation of the controlled object.

Still another object of the present invention is to provide a novel position control system of the above character wherein means, responsive to the speed of the controlled object or to the speeds of the controlling and controlled objects, is employed for producing a potential to be combined with the signal potential for controlling the operation of the controlled object, whereby the system is caused to synchronize in a dead beat manner.

Other objects and advantages will become apparent from the specification, taken in connection with the accompanying drawings wherein the invention is embodied in concrete form.

In the drawings,

Fig. 1 is a wiring diagram illustrating a preferred form of the novel position control system of this invention.

Fig. 2 is a wiring diagram illustrating a somewhat modified form of the invention.

Fig. 3 is a wiring diagram illustrating a modified form of the invention shown in Fig. 2.

Fig. 4 is a signal voltage diagram obtaining in the form of the invention shown in Fig. 2.

Similar characters of reference are employed in all of the above views to indicate corresponding parts.

Referring now to Fig. 1 of the said drawings, the controlling object 1 is illustrated as a handwheel, although the same might be any small power turned object, such as a telescope, the angular motion of which is to be accurately and immediately repeated by the searchlight 2, or other controlled object, through the operation of the novel position control system of this invention.

The high and low speed transmitting devices 3 and 4, respectively, and their connected receiving devices 5 and 6, respectively, may be of any suitable type. Preferably, these devices are of the A. C. type in which the transmitting and repeating devices are similar in construction and are each provided with a polycircuit armature winding and a single circuit field winding. In the drawings, these devices are each provided with a three-circuit armature winding 7 physically similar to a three-phase star connected armature winding. This armature winding may be mounted on the stator while the field winding 8 is on the rotor. In connecting each receiving device to its respective transmitting device, three conductors are used by means of which like points of the two armature windings 7 of the devices are interconnected.

The field windings 8 of the transmitters are connected to a suitable source of A.-C. supply, such as the three phase supply leads 9. Field winding 8 of the high speed transmitter 3 is connected to handwheel 1 through reduction gearing 10, whereas field winding 8 of the low speed transmitter 4 is connected to handwheel 1 directly as by shaft 11.

Field windings 8 produce in their respective armature windings 7 resultant alternating magnetic fields having positions in space determined by the relative positions of windings 7 with respect to windings 8. Any rotation of the transmitter field windings or rotors 8 caused by angular movement of handwheel 1 produces a corresponding angular shifting of the axes of the magnetic fields of their respective armature windings resulting in a corresponding shifting of the fields of the armature windings 7 of the receivers 5 and 6, thereby tending to cause field windings 8 of the receivers to follow up such shift, but since these field windings are mechanically connected by the mechanical follow-up transmission 13 to the controlled object 2, alternating E. M. F.'s are induced in the field windings 8 of the receivers 5 and 6, the value of which E. M. F.'s is substantially proportional to the angular displacement between the handwheel 1 and searchlight 2, i. e., for small angular displacements.

The terminals of the field winding 8 of high speed receiver 5 are connected to the terminals of a resistor 14. One terminal of the resistor 14 is connected to one side of the primary winding of a transformer 15, the other side of which primary is connected to the armature 16 of a double throw relay 17 having an operating coil 18. Armature 16 is biased to engage to a contact 19 connected to a point along resistor 14. The terminals of the secondary winding of transformer 15 are respectively connected through condensers 20 and 20' to the grids of grid controlled rectifier tubes 21 and 21'. The anodes of tubes 21 and 21' are respectively connected to corresponding ends of the secondary windings of motor control transformers 22 and 22'. The other ends of the secondary windings of transformers 22 and 22' are connected together and to the cathodes of tubes 21 and 21'. Corresponding ends of the primary windings of transformers 22 and 22' are connected to corresponding ends of compensating windings 23 and 23' of a repulsion motor 24. The remaining ends of the primary windings of transformers 22 and 22' are connected together and to source 9. Compensating windings 23 and 23' have a common field core. The other ends of compensating windings 23 and 23' are connected together and to one terminal of the main winding 25 of motor 24, the other terminal of which winding is connected to one phase lead of three phase supply 9. The rotor 26 of motor 24 is provided with a single pair of permanently short circuited brushes that are preferably disposed so as to lie on an axis extending parallel to the flux field of compensating windings 23 and 23'.

One terminal of the field winding 8 of the low speed receiver 6 is connected through a current limiting resistance 27 to one side of the primary winding of a transformer 28, the said primary winding having its other side connected to the remaining terminal of field winding 8. A resistor 30 and a voltage limiter 31 are arranged in series and connected across the terminals of field winding 8 of the low speed receiver. The voltage limiter 31 is illustrated as consisting of two copper oxide cells connected in parallel but arranged to pass currents flowing in opposite directions, i. e., one cell will pass current flowi in one direction through resistor 30, whereas the other cell will pass current flowing in the opposite direction.

The limiter 31 possesses an non-linear voltage-current characteristic such that it serves to limit the voltage drop across the same to a suitable low value of the order of approximately one volt. It is to be understood that if a higher voltage is desired in any particular installation, two or more of the cells may be arranged in series in each branch of the voltage limiter. One side of the voltage limiter 31 is connected through a lead 32 to one side of the primary winding of transformer 15, whereas the opposite side of limiter 31 is connected through a lead 40' and the secondary winding 33 of a dynamic transformer or speed generator 34 to contact 19' of relay 17. The dynamic transformer 34 supplies a voltage or signal proportional to the velocity of the driven element 2 has a primary winding 40 excited from the A.-C. supply 9, which winding is at right angles to the secondary winding 33. The rotor comprises a thin copper cylinder 42 on an iron core 43. When the rotor is stationary, no voltage is induced in the secondary 33, but as the rotor is speeded up the lines of force from winding 40 are distorted to pass through winding 33, the amount of distortion and hence the voltage induced in secondary winding 33 depending on the speed of the rotor.

When relay coil 18 is energized, as will further appear, armature 16 is moved into engagement with contact 19', thereby connecting the opposite side of voltage limiter 31 through lead 40', winding 33 and armature 16 to the other side of the primary winding of transformer 15.

The secondary winding of transformer 28 has one end thereof connected through grid resistance 35 to the grid of a three element tube 36 while its other side is connected through the grid bias resistance 37 to the tube cathode. Cathode heater circuits are not shown in the drawings for the sake of simplicity. Negative D.-C. supply lead 38 is connected through the secondary of transformer 28 and grid resistance 35 to the grid of tube 36. The fixed D.-C. bias applied to the grid of tube 36 serves to normally reduce the tube anode current to a low value that is insufficient to operate relay 17 connected in the output of tube 36, and brings the grid to a point on the tube's grid voltage-plate current characteristic such that anode bend rectification takes place upon the application of an A.-C. signal through transformer 28 to the grid.

The positive D. C. lead 38' is connected through lead 41 and relay operating coil 18 to the anode of tube 36. Condenser 42 serves to shunt A. C. across the terminals of coil 18.

In operation, assume the system is started at a time when the relative displacement of the objects 1 and 2 is greater than the range of control of the high speed transmitter-receiver arrangement 3—5, i. e., the displacement is more than 5° when using a high speed ratio of 36:1 and a low speed ratio of 1:1. In this case, the A. C. signal voltage appearing across the field winding 8 of the low speed receiver 6 will be appreciable and acts through resistance 27, transformer 28 and grid resistance 35 upon the grid of tube 36. A substantial current now appears in the output circuit of tube 36, resulting in the operation of relay 17 so that a circuit is established from one side of voltage limiter 31 through lead 40', secondary winding 33, contact 19', armature 16 to the primary of transformer 15 and from this primary back to the other side of limiter 31. The limited voltage drop produced by the 1:1 A. C. signal voltage across voltage limiter 31 is thus fed to the transformer 15 and is passed on from this transformer through condensers 20 and 20' to the grids of the grid controlled rectifiers 21 and 21' in 180° out of phase relation.

As is well known to those skilled in the art, the average value of the current flowing in the anode circuits of the grid controlled rectifiers 21 and 21' may be varied by varying the phase relationship between the voltages applied to the grids and the anodes, respectively. Alternating voltage is supplied to the grids of tubes 21 and 21' by a transformer 44 fed from source 9, the transformer 44 serving to apply a voltage to the grids of tubes 21 and 21' that is not in phase with that applied to the anodes of these tubes through motor control transformers 22 and 22'.

With the 1:1 limited signal voltage applied to tubes 21 and 21' in 180° out of phase relation in addition to the A. C. bias voltage supplied from transformer 44, one of these tubes is rendered conducting depending on the direction of turning of handwheel 1. Thus, for example, if tube 21 is rendered conducting, the primary winding of motor control transformer 22 is shorted, in effect, and motor 24 is caused to operate in the proper direction to move the searchlight 2 into synchronism with handwheel 1.

As the motor 24 speeds up, the dynamic transformer 34 serves to develop in winding 33 an increasing E. M. F. that bucks the limited 1:1 signal voltage, thereby limiting the anode circuit current of the operating rectifier tube and hence also limiting the speed of motor 24 to a desired value, whereby searchlight 2 moves toward synchronism with the handwheel 1 at a suitable speed which may be substantially fixed or variable, depending upon the requirements of any particular installation.

As the searchlight moves toward synchronism with the handwheel, the 1:1 signal voltage output of receiver 6 gradually falls off, since the mechanical follow-up 13 causes field winding 8 to follow the motion of the searchlight. Hence a point is finally reached when the current output of tube 36 is no longer sufficient to hold relay armature 16 in engagement with contact 19', whereupon armature 16 moves into engagement with contact 19. By this time the relative displacement of the objects has decreased so as to be within the range of control of the high speed transmitter-receiver arrangement 3—5, which thereafter takes over the control and brings the objects into substantially exact synchronism. It will be noted that with armature 16 engaging contact 19, the signal voltage output of high speed receiver 5, limited by resistance 14, is applied to transformer 15 for controlling the grid controlled rectifiers 21 and 21' and hence the motor 24.

It is to be understood that, if desired, the signal voltages may be amplified and combined with time derivatives thereof before application to the grid controlled rectifiers 21 and 21', as described and claimed in copending applications Serial Nos. 11,424 and 38,378, the latter now U. S. Patent No. 2,139,558, dated December 6, 1938, of which applications the present applicant is one of the co-inventers. Thus, the signal voltage or resultant signal voltage may be amplified with partial rectification before application to transformer 15, and then transmitted through a derivative-taking circuit such as 29, 31 of Fig. 1 of the above Patent 2,139,558, whereby the actual signal impressed on tubes 21, 21', of the present application will represent both the displacement control signal and the second time derivative thereof.

Owing to the use of the compensating motor windings 23 and 23' in connection with the primaries of transformers 22 and 22', the motor 24 remains cool in use and does not heat up during idle or light load periods. This will be apparent when it is noted that during idle periods the high impedance of the primary windings of transformers 22 and 22' serves in effect to partially remove the compensating field windings 23 and 23' from the line, thereby greatly reducing the current through these field windings. Also, during idle periods the fields of windings 23 and 23' buck each other so that no current is induced in rotor 26, thereby keeping this rotor cool and enabling the same to be greatly overloaded for intermittent operation of the system, resulting in the use of smaller and lighter motors than heretofore possible.

In the forms of the invention shown in Figs. 2 and 3, parts that are similar to parts of Fig. 1 are similarly numbered.

The system shown in Fig. 2 is a somewhat simplified arrangement wherein means for limiting the motor speed is omitted. In this system the signal voltage output of the high speed or fine receiver 5 is limited by the voltage limiter 31 and this limited output is added in series with the voltage output of the low speed or coarse receiver 6 and the combined voltage applied for controlling the grid controlled rectifier tubes 21 and 21'. In operation, the voltage from high speed receiver 5 is passed through current limiting resistance 45 to voltage limiter 31, which serves to limit the output of receiver 5. This is shown in Fig. 4, wherein the curve 46 representing the limited output of the high speed receiver is flat topped. Thus, the voltage across the limiter 31 rises steeply during the first few degrees of displacement, thus giving torque proportional to displacement within the desired range. Beyond this range the voltage ceases to rise, and levels off at a constant value until the high speed receiver turns throughout nearly 180° when the signal falls off smoothly to zero. This high speed signal voltage is added directly in series with the low speed signal voltage derived from field winding 8 of receiver 6. Thus, in Fig. 4 the curve 47 represents the low speed receiver output voltage while curve 46' represents this output with the limited high speed receiver voltage 46 superimposed thereon. It will be apparent from an inspection of Fig. 4 that when the high speed signal has reversed at A, the sum of this high speed voltage and the low speed voltage is still in a direction or phase to drive the system to zero relative displacement. It can readily be seen that if the high speed signal were not limited, i. e., if it had the complete sine form shown in dot-dash lines in Fig. 4, the sum of the signal voltages would drop below the zero line 48, as shown at B, causing motor 24 to operate in a direction to drive the controlled object out of instead of toward synchronism with the controlling object. However, this cannot take place when using the system of Fig. 2, owing to the presence of the voltage limiter 31.

In Fig. 3, a dead beat, non-overrunning synchronizing system especially adapted for highly refined uses, such as gun control, is shown. In this system, the signal voltage output of the high speed or fine receiver 5 is also limited by the voltage limiter 31 and this limited output, together with the output of the low speed or coarse receiver 6, are connected in series and are aided by the voltage output of a dynamic transformer or speed generator 34' that is similar to dynamic transformer 34 previously described and supplies a voltage or signal proportional to the speed of controlling element 1. Dynamic transformer 34' has its rotor driven from handwheel 1 and the secondary winding 33 of this transformer is connected by lead 48 in series with field winding 8 of the low speed receiver 6 and voltage limiter 31 to the primary of transformer 15. Lead 48 also includes the secondary 33 of a dynamic transformer 34 driven from the repulsion motor 49, as in Fig 1. Dynamic transformer 34 acts to buck the output voltages of the receivers 5 and 6 combined with that of dynamic transformer 34'.

In operation, the limited displacement voltage of the high speed receiver, the voltage of the low speed receiver, that of the dynamic transformer 34' and the reverse voltage of the dynamic transformer 34, all combine to form the controlling signal that is applied by transformer 15 to the grids of tubes 21 and 21' for determining the operation of motor 49. When the handwheel and searchlight, i. e., controlling and controlled objects, are traveling at the same speed, transformers 34 and 34' produce equal and opposite voltages and hence have no effect on the system. Synchronization is effected by the low speed, i. e., 1:1 voltage which overrides the limited high speed, i. e., 36:1 voltage, thereby driving the follow-up faster than the handwheel, thus producing a net reverse speed voltage due to the excess of speed of transformer 34 over 34'. Thus, the system will synchronize in a dead beat fashion whether the handwheel is moving or stationary.

It will be understood that the combined signal voltages obtaining in the forms of the invention disclosed in Figs. 2 to 4 may be amplified and/or combined with time derivatives thereof before application to the grid controlled rectifiers 21 and 21', just as in the case of the structure shown in Fig. 1.

By a mono-periodic system, as used in the following claims, is meant one in which a transmitter and receiver will be electrically in step, or in a stable position with respect to one another, only in one position of adjustment, which position may be regarded as the position of coincidence of the transmitter and receiver.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. In a position control system of the character described, in combination, controlling and controlled objects, a motor for driving said controlled object, thermionic control means for said motor, high speed and low speed transmitters operated from said controlling object, high speed and low speed receivers electrically connected to said transmitters, said receivers being arranged to be electrically connected to said thermionic control means to supply signal voltages thereto, and a voltage limiter arranged for connection to said thermionic control means and connected in the output of at least one of said receivers for limiting the signal voltage of the latter supplied to said thermionic control means, thereby limiting the speed of the controlled object.

2. A position control system of the character described, comprising a plurality of objects arranged to move in synchronism, synchronizing means interconnecting said objects, said synchronizing means including high speed and low speed transmitter and connected receiver arrangements for setting up alternating potentials responsive to the departure of said objects from synchronism, voltage limiting means for limiting the output potential of one of said transmitter-receiver arrangements, thermionic means arranged for electrical connection to said transmitter-receiver arrangements for receiving said alternating potentials, and motive means controlled from said thermionic means for causing said objects to return to synchronism, the operation of said voltage limiting means serving to prevent excessive speed of said motive means.

3. In a position control system, power consuming means, grid controlled rectifiers for controlling the supply of operating energy to said power consuming means, a transmitter-receiver arrangement for producing a signal potential, a voltage limiter connected in the output of said transmitter-receiver arrangement for limiting said signal potential, and means for applying such limited signal potential to the grids of said grid controlled rectifiers.

4. A position control system of the character described, wherein a synchronizing force is exerted between a plurality of objects arranged to operate in synchronism and wherein a change in the A. C. electrical characteristics of said system is produced by departure of said objects from synchronism, comprising high speed and low speed transmitter and receiver arrangements operated from one of said objects for producing said change in A. C. electrical characteristics, means for modifying said change in A. C. electrical characteristics by by-passing the top portions of voltage waves, and thermionic rectifier means responsive to said modified change in A. C. electrical characteristics for controlling the value of said synchronizing force.

5. In a positional control system having a controlling object, a controlled object and means for driving said controlled object, an electrical circuit for controlling said driving means, said electrical circuit comprising means for producing an alternating potential responsive to the relative displacement of said controlling object with respect to said controlled object, voltage limiting means for limiting the maximum value of said alternating potential, whereby the top portions of the voltage waves are removed, and grid controlled rectifier means for receiving said limited alternating potential and for determining the operation of said driving means.

6. In a position control system of the character described, in combination, controlling and controlled objects, a motor for driving said controlled object, grid controlled rectifier means for controlling the supply of operating energy to said motor, high speed and low speed transmitter and connected receiver arrangements operated from said controlling object for producing control potentials for said rectifier means, said low speed arrangement operating to supply the essential control potential when said objects are out of synchronism by a substantial amount and said high speed arrangement operating to supply the essential control potential when said objects are but slightly out of synchronism, a voltage limiter for limiting the potential output of one of said arrangements, and transformer means responsive to the operation of said motor for producing a potential opposing the control potential of at least one of said arrangements.

7. In a position control system of the character described, in combination, controlling and controlled objects, a motor for driving said controlled object, grid controlled rectifier means for controlling the supply of operating energy to said motor, high speed and low speed transmitter and connected receiver arrangements operated from said controlling object for producing control potentials for said rectifier means, said low speed arrangement operating to supply the essential control potential when said objects are out of synchronism by a substantial amount and said high speed arrangement operating to supply the essential control potential when said objects are but slightly out of synchronism, a voltage limiter for limiting the potential output of said low speed arrangement, and transformer means operating in response to the speed of said motor for further reducing the thusly limited potential output of said low speed arrangement.

8. In a position control system of the character described, in combination, controlling and controlled objects, a motor for driving said controlled object, grid controlled rectifier means for controlling the supply of operating energy to said motor, high speed and low speed transmitter and connected receiver arrangements operated from said controlling object for producing control potentials for said rectifier means, said low speed arrangement operating to supply the essential control potential when said objects are out of synchronism by a substantial amount and said high speed arrangement operating to supply the essential control potential when said objects are but slightly out of synchronism, a voltage limiter for limiting the potential output of said high speed arrangement, and transformer means operating in response to the speed of said motor for producing a potential opposing the limited potential of said high speed arrangement combined with that of said low speed arrangement.

9. In a position control system of the character described, in combination, controlling and controlled objects, a motor for driving said controlled object, grid controlled rectifier means for controlling the supply of operating energy to said motor, high speed and low speed transmitter and connected receiver arrangements operated from said controlling object for producing control potentials for said rectifier means, said low speed arrangement operating to supply the essential control potential when said objects are out of synchronism by a substantial amount of said high speed arrangement operating to supply the essential control potential when said objects are but slightly out of synchronism, a voltage limiter for limiting the potential output of said high speed arrangement, transformer means operating in response to the speed of said motor for producing a potential opposing the limited potential of said high speed arrangement combined with that of said low speed arrangement, and additional transformer means operating in response to the speed of said controlling object for producing a potential aiding the combined net output potentials of said high and low speed arrangements.

10. A position control system of the character described, comprising a plurality of objects arranged to move in synchronism, synchronizing means interconnecting said objects, said synchronizing means including high speed and low speed transmitter and connected receiver arrangements for setting up alternating potentials responsive to the departure of said objects from synchronism, voltage limiting means for limiting the output potential of said low speed arrangement, grid controlled rectifier means for receiving said alternating potentials, and relay means responsive to the potential output of said low speed arrangement for connecting the latter to said rectifier means, said relay means serving to connect said high speed arrangement to said rectifier means when said low speed arrangement is not connected thereto, and motive means controlled from said rectifier means for causing said objects to return to synchronism.

11. In a position control system, power consuming means, grid controlled rectifiers for controlling the supply of operating energy to said power consuming means, a transmitter-receiver arrangement for producing a signal potential, means for limiting the signal potential of said arrangement, a relay for connecting the limited potential output of said arrangement to the grids of said grid controlled rectifiers, and thermionic means operating in response to the potential output of said arrangement for controlling said relay.

12. In a positional control system having a controlling object, a controlled object and means for driving said controlled object, an electrical circuit for controlling said driving means, said electrical circuit comprising means for producing an alternating potential responsive to the relative displacement of said controlling object with respect to said controlled object, a voltage limiting means for limiting the maximum value of said alternating potential, grid controlled rectifier means for receiving said limited alternating potential and for determining the operation of said driving means, and potential feed back means operating in response to the speed of said driving means for opposing said limited alternating potential.

13. In a control system, a source of A. C., an A. C. compensated repulsion motor having a main and compensating field windings arranged to be supplied from said source, grid controlled rectifier means for controlling the supply of operating energy from said source to said field windings, transformer means connected to said repulsion motor windings and to said rectifier means, means for producing an A. C. signal potential derived from said source, means for limiting said signal potential and for applying the same to said rectifier means for causing operation of said motor, the impedance of said transformer means serving, during idle periods of said motor, in effect to partially remove said motor field windings from across said A. C. source, thereby retaining said motor in a cool condition.

14. In a control system, a source of A. C., an A. C. compensated repulsion motor having a main and a pair of opposed compensating field windings arranged to be supplied from said source, grid controlled rectifier means for controlling the supply of operating energy from said source to said field windings, transformer means having its primary included in the connection between said source and said main and compensating field windings, said transformer means having its secondary connected in the output of said rectifier means, means for producing an A. C. signal potential derived from said source and for applying the same to control said rectifier means for effecting operation of said motor, the impedance of said transformer means serving, during idle periods of said motor, in effect to partially remove said motor field windings from said A. C. source, while said opposed compensating windings serve to substantially eliminate the generation of current in the rotor of said motor, thereby retaining said motor in a cool condition.

15. In a position control system of the character described, in combination, controlling and controlled objects, a motor for driving said controlled object, thermionic valve means for determining the supply of operating energy to said motor, high speed and low speed transmitter and connected receiver arrangements operated from said controlling object for producing signal potentials for controlling said thermionic valve means, a follow-up connection between said motor and said high and low speed receiver arrangements, the signal potential of said high speed receiver arrangement normally controlling said thermionic valve means, means responsive to an increase in the signal potential of said low speed arrangement for transferring control from said high speed receiver to said low speed arrangement, and a voltage limiter for limiting the output of said low speed receiver arrangement.

16. In a position control system of the character described, in combination, controlling and controlled objects, a motor for driving said controlled object, thermionic valve means for determining the supply of operating energy to said motor, high speed and low speed transmitter and connected receiver arrangements operated from said controlling object for producing signal potentials for controlling said thermionic valve means, a follow-up connection between said motor and said high and low speed receiver arrangements, and means for applying the signal potentials of said high speed and low speed arrangements simultaneously to said thermionic valve means, whereby the high speed arrangement normally predominates in the control of said thermionic valve means, while the low speed arrangement predominates in the control when its signal potential exceeds that of the former.

17. In a position control system of the character described, in combination, controlling and controlled objects, a motor for driving said controlled object, grid controlled rectifier means for controlling the supply of operating energy to said motor, high speed and low speed transmitter and connected receiver arrangements operated from said controlling object for producing control potentials for said rectifier means, said low speed arrangement operating to supply the essential control potential when said objects are out of synchronism by a substantial amount and said high speed arrangement operating to supply the essential control potential when said objects are but slightly out of synchronism, and transformer means responsive to the operation of said motor for producing a potential opposing the control potential of at least one of said arrangements.

18. In a position control system, power consuming means, grid controlled rectifiers for controlling the supply of operating energy to said power consuming means, a transmitter-receiver arrangement for producing an A. C. signal potential, a voltage limiter for removing the tops of said A. C. signal potential, a relay for connecting the limited potential output of said arrangement to the grids of said grid controlled rectifiers, and thermionic means operating in response to the potential output of said arrangement for controlling said relay.

19. In a position control system, power consuming means, thermionic valve means for determining the operation of said power consuming means, a controlling object, a transmitter-receiver arrangement operated from said controlling object for producing a signal potential for controlling said thermionic valve means, transformer means responsive to the operation of said controlling object for producing a potential for aiding said signal potential, and additional transformer means responsive to the operation of said power consuming means for producing a potential for opposing said signal potential.

20. In a control system, a source of A. C., an A. C. compensated repulsion motor having a main and compensating field windings arranged to be supplied from said source, thermionic valve means for controlling the supply of operating energy from said source to said field windings, transformer means connected to said repulsion motor field windings and to said thermionic valve means, means for producing a signal potential for controlling said thermionic valve means and effecting operation of said motor, the impedance of said transformer means serving, during idle periods of said motor, in effect to partially remove said motor field windings from said A. C. source.

21. A position control system as defined in claim 19, wherein said first named transformer means comprises potential generating means driven from said controlling object and wherein said additional transformer means comprises potential generating means driven from said power consuming means.

22. A system comprising a motor, a controlled object driven therefrom, an amplifier whose output system includes said motor, a controlling object, means for impressing upon the input system of said amplifier an electromotive force variable in accordance with the relative displacement of said objects, and means for impressing upon said amplifier input system electromotive forces dependent respectively upon the respective speeds of said controlling and controlled objects, said last named electromotive forces acting in opposition, whereby the net result of such forces acting in combination with said displacement electromotive force determines the input to said amplifier.

23. A system comprising a motor, an amplifier whose output system includes said motor, means for impressing upon the input system of said amplifier an electromotive force variable in accordance with the sense and magnitude of change of a condition or quantity, means for impressing upon said amplifier input system an electromotive force whose magnitude is dependent upon the first derivative with respect to time of said first named electromotive force, and means for opposing said last named electromotive force with an electromotive force dependent upon the operation of said motor.

24. In a position control system, a servo motor, thermionic valve means for determining the operation of said motor, a controlling object, means operated at least partially from said controlling object for producing a signal potential for controlling said thermionic valve means, a voltage limiter in the output of said transmitter-receiver arrangement for limiting said signal potential, and potential generating means driven from said controlling object for producing a potential which varies with the speed of the controlling object for controlling said thermionic means jointly with said signal potential.

25. A system comprising a motor, a controlled object driven therefrom, an amplifier-rectifier, means for controlling said motor in accordance with the rectified output thereof, a controlling object, means for impressing upon the input system of said amplifier-rectifier an alternating electromotive force variable in accordance with the relative displacement of said objects, and means for impressing upon said amplifier-rectifier input system an alternating electromotive force whose magnitude is dependent upon rate of movement of said controlling object.

26. An electric transmission system including a transmitter and at least one receiver arranged to be capable of mono-periodic operation with respect to one another, comprising means for introducing into the control of the receiver a force which contains a component in magnitude proportional to the degree of positional displacement which may exist between the receiver and the transmitter director member, and means for introducing into said control a further component proportional to the difference in speed of the receiver and the transmitter director member.

27. In a positional follow-up control wherein a reversible motor drives a system into angular correspondence with a Selsyn type data transmitter, means for producing a signal from relative displacement between the transmitter and the driven system, means for producing a signal proportional to the angular velocity of rotation of said transmitter, means for producing a signal proportional to the angular velocity of rotation of said motor, means for combining said last two signals, means for combining the first of said signals with the combined last two signals, and means for impressing the resultant upon the input circuit of an amplifier, the output of which controls the speed and direction of rotation of the said reversible power motor.

28. The method of producing dead beat response in a follow-up system operating from a Selsyn type transmitter which comprises actuating said follow-up system from a resultant signal composed of a component due to relative displacement which tends to drive the follow-up in a direction to reduce said relative displacement, and a component which tends to oppose change of relative displacement, said last mentioned component being the difference between a voltage proportional to follow-up speed and a voltage proportional to the transmitter speed.

29. The method of producing dead beat response in a follow-up system operating from a Selsyn type transmitter which comprises controlling said follow-up system from a resultant signal composed of a component due to relative displacement between said transmitter and said system which tends to drive said follow-up system in a direction to reduce said relative displacement, and a component which tends to oppose change of said relative displacement, said last component being due to difference in the speeds of said follow-up system and said transmitter.

30. A remote positional control comprising a Selsyn type transmitter for transmitting angular flux directions, a receiver adapted to produce a voltage when its rotor and stator are not in correct alignment with said flux directions, a motor for driving said receiver to properly align its stator and rotor, means for controlling said motor including a power amplifier, the output of which controls the speed and direction of rotation of said motor in accordance with a composite signal comprising two components, one of said components being the voltage output of said receiver, phased to drive the said receiver in direction to reduce said voltage to zero, and the other of said components comprising the difference between a voltage proportional to said transmitter angular velocity of rotation, said voltage being of such phase as to drive said receiver in the same direction of rotation as said transmitter, and a voltage proportional to said receiver angular velocity of rotation, said last voltage being so phased as to drive said receiver in the opposite direction to its direction of rotation.

31. A system comprising a motor, a controlled object driven therefrom, an amplifier whose output system includes said motor, a controlling object, means for impressing upon the input system of said amplifier an electromotive force variable in accordance with the relative displacement of said objects, and means for impressing upon said amplifier input system electromotive forces dependent respectively upon the respective speeds of said controlling and controlled objects.

32. A positional control system comprising a controlling object, a controlled object, motive means for actuating said controlled object, and means for controlling said motive means in accordance with a relative displacement between said two objects and in accordance with the difference in speeds of said two objects.

33. A control system comprising a motor, a controlled object driven therefrom, a controlling object, means for producing a signal variable in accordance with the relative displacement of said two objects, means for producing two signals respectively variable in accordance with variations in the speeds of said controlling and controlled object, and means for controlling said motor in accordance with a combination of said signals.

34. A positional control system comprising a motor, a controlled object driven therefrom, a controlling object, means for producing an electric signal variable in accordance with the relative displacement of said two objects, means for producing an electric signal variable in accordance with the speed of said controlling object, means for producing an electric signal variable in accordance with the speed of said controlled object, and means for controlling said motor in accordance with a combination of said signals.

35. A positional control system comprising a motor, a controlled object driven therefrom, a controlling object, means for producing an electric signal variable in sign and magnitude in accordance with relative displacement of said objects in angular direction and amount, means for producing respective electric signals variable in sign and magnitude in accordance with the directions and speeds of rotation of said objects, and means for controlling said motor in accordance with a combination of said signals.

36. In a positional follow-up control wherein a reversible motor drives a system into angular correspondence with a Selsyn type data transmitter, the combination comprising means for producing a signal from relative displacement between said transmitter and said driven system, means for producing a signal proportional to the angular velocity of rotation of said transmitter, means for producing a signal proportional to the angular velocity of rotation of said driven system, and means for controlling the speed and direction of rotation of said reversible motor from a combination of said signals.

37. A system comprising a motor, a controlled object driven therefrom, an amplifier whose output system includes said motor, a controlling object, means for impressing upon the input system of said amplifier an electromotive force variable in accordance with the relative displacement of said objects, and means for impressing upon said amplifier input system electromotive forces dependent respectively upon the respective speeds of said controlling and controlled objects, said last named electromotive forces acting in opposition, whereby the net result of such forces acting in combination with said displacement electromotive force determines the input to said amplifier.

38. In a positional control system for a ponderable driven object having substantial inertia, a servo motor for turning said object, thermionic valve means for determining the operation of said servo motor, a controlling object, a transmitter-receiver arrangement producing a signal potential proportional to the positional disagreement between said objects for controlling said thermionic valve means, a dynamic transformer responsive to the speed of said controlling object for producing a potential for aiding said signal potential, and an additional dynamic transformer responsive to the speed of said servo motor for producing a potential opposing said signal potential.

39. In a positional control system for a ponderable driven object having substantial inertia, the combination comprising a servo motor for turning said driven object, a controlling object, a transmitter-receiver arrangement for producing a signal potential proportional to the positional disagreement between said objects for controlling said motor, means responsive to the speed of said controlling object for producing a potential for aiding said signal potential, and additional means responsive to the speed of said servo motor for producing a potential opposing said signal potential.

40. In a system for positioning a controlled member in accordance with the movement of a controlling member, the combination of electrical means responsive to positional disagreement between the member, means energized by said electrical means for driving the controlled member in accordance with the movement of the controlling member, a generator actuated by said controlling member, a generator actuated by said controlled member, and means for modifying the output of said electrical means with the joint output of said generators to effect damping of the movement of said controlled member.

41. In a system for positioning a controlled member in accordance with the movement of a controlling member, the combination of driving power means for said controlled member, means responsive to the degree of positional disagreement between said members for inducing a signal voltage corresponding in magnitude and direction to the degree and direction of such positional disagreement, means for producing a signal voltage corresponding to speed disagreement between said members, a plurality of thermionic relays having plate circuits adapted to selectively control the operation of said driving power means, and means for impressing a combination of said voltages jointly on said relays to energize said driving power means and thereby move the controlled member in a direction to bring the same into positional agreement with the controlling member.

42. In a control system comprising a controlling object, a driven object and driving means therefor, means for producing an alternating electric signal corresponding in amplitude to the speed of said controlling object, means for producing a second alternating electric signal of substantially the same frequency as said first signal and corresponding in amplitude to the speed of said driven object and having a predetermined phase relation with respect to the said first signal, means for combining said signals and means for controlling said driving means by said combined signals.

43. In a control system, a source of alternating current, an alternating current compensated repulsion motor having a main and compensating field windings arranged to be supplied from said source, transformer means connected to said repulsion motor windings, means for producing a control signal, and means responsive to said signal for controlling the impedance offered by said transformer to flow of current through said windings, the impedance of said transformer means serving during idle periods of said motor in effect to partially remove said motor field windings from across said A. C. source, thereby retaining said motor in a cool condition.

44. A positional control system comprising a controlling object, a controlled object, means for driving said controlled object, means for producing a control signal corresponding to the relative displacement of said objects, means for limiting the maximum value of said control signal, means responsive to said limited signal for determining the operation of said driving means, and means responsive to the operation of said controlling object for producing a further control potential for determining the operation of said driving means jointly with said limited control signal.

45. A positional control system comprising a controlling object, a controlled object, a motor for driving said controlled object, high speed and low speed transmitters operated from said controlling object, high speed and low speed receivers electrically connected to said transmitters, the signal outputs of said receivers corresponding to the relative displacement of said objects, signal limiting means for limiting the signal output of one of said receivers, means for supplying a signal proportional to the speed of said controlling object, and means controlled by all of said signals including the signal so limited for controlling the operation of the motor.

FRANCIS L. MOSELEY.